United States Patent
Watanabe

(10) Patent No.: US 12,508,072 B2
(45) Date of Patent: Dec. 30, 2025

(54) ELECTRODE CATHETER

(71) Applicant: Japan Lifeline Co., Ltd., Tokyo (JP)

(72) Inventor: Takafumi Watanabe, Tokyo (JP)

(73) Assignee: JAPAN LIFELINE CO., LTD., Tokyo (JP)

( * ) Notice: Subject to any disclaimer, the term of this patent is extended or adjusted under 35 U.S.C. 154(b) by 332 days.

(21) Appl. No.: 18/325,590

(22) Filed: May 30, 2023

(65) Prior Publication Data

US 2023/0320780 A1   Oct. 12, 2023

Related U.S. Application Data

(63) Continuation of application No. PCT/JP2021/032371, filed on Sep. 2, 2021.

(51) Int. Cl.
*A61B 18/14* (2006.01)
*A61B 18/00* (2006.01)

(52) U.S. Cl.
CPC . *A61B 18/1492* (2013.01); *A61B 2018/00011* (2013.01); *A61B 2018/00101* (2013.01);
(Continued)

(58) Field of Classification Search
CPC ...... A61B 18/1492; A61B 2018/00011; A61B 2018/00029; A61B 2018/00101;
(Continued)

(56) References Cited

U.S. PATENT DOCUMENTS 8,974,453 B2 * 3/2015 Wang ................. A61B 18/1492
606/41

2009/0259222 A1 * 10/2009 Wang ................. A61B 18/1492
606/41
2012/0157990 A1 * 6/2012 Christian ........... A61B 18/1492
606/41

FOREIGN PATENT DOCUMENTS

JP     2009537243 A    10/2009
JP     2010505596 A     2/2010
(Continued)

OTHER PUBLICATIONS

An Office Action in corresponding JP Application No. 2023-508436 dated Sep. 3, 2024.
(Continued)

*Primary Examiner* — Michael F Peffley
(74) *Attorney, Agent, or Firm* — MUNCY, GEISSLER, OLDS & LOWE, P.C.

(57) ABSTRACT

An electrode catheter includes a catheter shaft, an irrigation member, and a distal-end electrode. A female thread is formed on the distal-end electrode. The irrigation member includes a first component having an annular shape, and a second component having an eccentric flow path formed inside a proximal-end part thereof and a male thread formed at a distal-end part thereof, the male thread being screwed to the female thread of the distal-end electrode. With the first component and the distal-end electrode fitted to each other, the first component and the second component fitted to each other, the distal-end portion of the second component inserted into the distal-end electrode, and the female thread and the male thread screwed to each other, the distal-end electrode and the irrigation member are connected to each other while forming, inside the first component, a storage space for a liquid.

15 Claims, 15 Drawing Sheets

(52) U.S. Cl.
CPC .......... *A61B 2018/00595* (2013.01); *A61B 2018/00791* (2013.01); *A61B 2218/002* (2013.01)

(58) Field of Classification Search
CPC .......... A61B 2018/00166; A61B 2018/00351; A61B 2018/00577; A61B 2018/00595; A61B 2018/00714; A61B 2018/00791; A61B 2218/002; A61M 25/0021
See application file for complete search history.

(56) References Cited

FOREIGN PATENT DOCUMENTS

| | | | |
|---|---|---|---|
| JP | 2013121384 | A | 6/2013 |
| JP | 2014505512 | A | 3/2014 |
| JP | 5881229 | B2 | 3/2016 |
| JP | 2017143997 | A | 8/2017 |
| WO | WO 2013/084679 | * | 6/2013 |
| WO | WO 2013/183339 | * | 12/2013 |

OTHER PUBLICATIONS

Japanese Office Action issued for corresponding Patent Application No. 2023-508436. dated Apr. 2, 2024 and its English Translation; pp. 1-7.

* cited by examiner

ELECTRODE CATHETER

CROSS REFERENCE TO RELATED APPLICATIONS

This application is a bypass continuation of International Application No. PCT/JP2021/032371, filed on Sep. 2, 2021, which claims priority to International Application No. PCT/JP2021/012137, filed on Mar. 24, 2021, which is incorporated herein by reference.

TECHNICAL FIELD

The disclosure relates to an electrode catheter, and more particularly to an electrode catheter having an electrode attached to a distal end thereof and including a mechanism for irrigating the electrode with a liquid such as physiological saline.

BACKGROUND

Some ablation catheters that are electrode catheters include an irrigation mechanism for cooling a distal-end electrode that is heated to a high temperature during cauterization.

As a catheter including an irrigation mechanism, there has been proposed an electrode catheter in which an insulating irrigation member is provided between a distal-end electrode with a temperature sensor arranged therein, and a catheter shaft (see JP 2009-537243 A).

It is stated that with this electrode catheter, the distal-end electrode is prevented from being cooled more than necessary by physiological saline supplied to the inside of the distal-end electrode, and the temperature can be accurately monitored and controlled by the temperature sensor during cauterization treatment.

When a deflection mechanism with a leaf spring is employed in an electrode catheter including an irrigation mechanism, a lumen serving as a flow path for physiological saline cannot be formed along the central axis in the distal-end flexible portion of the catheter shaft and must be formed eccentrically from the central axis.

Further, since the flow path for the physiological saline in the distal-end electrode or the irrigation member connected to the catheter shaft is also formed eccentrically from the central axis thereof, the physiological saline is injected from an eccentric opening (outlet of the flow path).

As described above, there is a problem in that with the physiological saline passing through the eccentric flow path and injected from the eccentric opening, irrigation may not be uniformly performed in the circumferential direction of the distal-end electrode.

In order to solve such a problem, the present applicant has proposed an electrode catheter including: a catheter shaft including a distal-end flexible portion and having at least one lumen serving as a liquid flow path eccentrically formed in the distal-end flexible portion; an insulating irrigation member connected on a distal-end side of the catheter shaft; and a distal-end electrode connected on a distal-end side of the insulating irrigation member. A plurality of irrigation openings (liquid injection ports) for irrigating a surface of the distal-end electrode with a liquid supplied from the catheter shaft is arranged in the insulating irrigation member at equiangular intervals along an outer circumference of the insulating irrigation member. The insulating irrigation member has formed therein: at least one eccentric flow path communicating with the at least one lumen serving as the liquid flow path in the catheter shaft; a storage space for the liquid that is a space communicating with the at least one eccentric flow path and that includes no partition wall in a circumferential direction of the insulating irrigation member so that the liquid from the at least one eccentric flow path is uniformly distributed in the circumferential direction; and a plurality of branch flow paths that communicates with the storage space, extends in a distal-end direction while being inclined outward, and each reaches a respective one of the plurality of irrigation openings. The insulating irrigation member includes a first component having a distal-end shape that is fittable to a rear-end shape of the distal-end electrode, and a second component having a distal-end shape that is fittable to a rear-end shape of the first component. The at least one eccentric flow path is formed inside the second component. The plurality of branch flow paths is formed inside the first component. The storage space is formed in a fitting portion between the first component and the second component (see JP 5881229 B).

With this electrode catheter, since the plurality of irrigation openings is formed arranged at equiangular intervals along the outer circumference of the insulating irrigation member, it is possible to irrigate the entire surface of the distal-end electrode in the circumferential direction.

In addition, since the eccentric flow path is formed inside the insulating irrigation member, the liquid from the lumen (the eccentrically formed liquid flow path) of the catheter shaft can be caused to flow toward the storage space.

In addition, since the insulating irrigation member has formed therein the liquid storage space that includes no partition wall in the circumferential direction and the plurality of branch flow paths that communicates with the storage space, extends in the distal-end direction while being inclined outward, and each reaches a respective one of the plurality of irrigation openings, the liquid that has reached the storage space through the eccentric flow path is regulated so as to be uniformly distributed in the circumferential direction in the storage space, and is then injected (for irrigation) from the irrigation openings through the plurality of branch flow paths extending in the distal-end direction. Therefore, there is no variation in the amount of liquid injected among the plurality of irrigation openings arranged at equiangular intervals, uniform injection can be performed in the circumferential direction of the insulating irrigation member, and the entire surface of the distal-end electrode can be evenly irrigated in the circumferential direction.

SUMMARY

In the electrode catheter described in JP 5881229 B, the insulating irrigation member is formed by fitting the distal end-side small-diameter part of the second component into the rear end-side recess of the first component, and the distal-end electrode is connected on the distal-end side of the insulating irrigation member by fitting the cylindrical portion of the distal-end electrode into the distal end-side recess of the first component.

However, such fitting may not allow the distal-end electrode and the insulating irrigation member (first component) to be rigidly connected to each other, and the distal-end electrode may fall off the insulating irrigation member connected to the catheter shaft.

In the electrode catheter described in JP 5881229 B, the distal-end side (distal-end swelling portion) of the distal-end electrode is sufficiently irrigated with the liquid that flows through the branch flow path formed in the first component and that is injected from the irrigation opening, whereby the distal-end side of the distal-end electrode can be sufficiently cooled, but the proximal-end side of the distal-end electrode cannot be sufficiently cooled.

Here, the distal-end electrode has an edge (for example, a proximal-end edge of the cylindrical portion) on the proximal-end side where the current density is high and the temperature tends to become high when a high-frequency current is applied. Thus, an irrigation mechanism is desired that is capable of efficiently cooling the proximal-end side of the distal-end electrode.

The disclosure has been made in view of the above-described circumstances.

An object of the disclosure is to provide an electrode catheter including an irrigation mechanism in which a distal-end electrode is rigidly connected to an insulating irrigation member connected to a catheter shaft so as not to fall off, and the proximal-end side of the distal-end electrode can also be efficiently cooled.

(1) An electrode catheter of the disclosure includes: a catheter shaft including a distal-end flexible portion, and having at least one lumen serving as a liquid flow path formed therein; an insulating irrigation member connected on a distal-end side of the catheter shaft; and a distal-end electrode having a hollow structure and connected on a distal-end side of the insulating irrigation member, at least one liquid injection port for irrigating a surface of the distal-end electrode with a liquid supplied from the catheter shaft being arranged at a distal-end position (an apparent distal-end position) of the insulating irrigation member, in which a female thread is formed on an inner circumferential surface of the distal-end electrode, the insulating irrigation member includes: a first component having an annular shape and including an opening on a distal-end side and a proximal-end side, respectively; and a second component having a flow path formed inside a proximal-end part thereof and a male thread formed on a distal-end part thereof, the flow path communicating with the at least one lumen serving as the liquid flow path, the male thread being screwed to the female thread, and with the first component and the distal-end electrode fitted to each other, the first component and the second component fitted to each other, a distal-end portion of the second component inserted into the distal-end electrode, and the female thread and the male thread screwed to each other, the distal-end electrode and the insulating irrigation member are connected to each other while forming a storage space for the liquid inside the first component.

With the electrode catheter having such a configuration, the first component and the distal-end electrode are fitted to each other, the first component and the second component are fitted to each other, and the female thread formed on the inner circumferential surface of the distal-end electrode fitted to the first component and the male thread formed on the second component fitted to the first component are screwed to each other, so that the distal-end electrode and the second component are connected to each other with the first component sandwiched therebetween. Accordingly, the distal-end electrode can be rigidly connected to the insulating irrigation member.

In addition, since the proximal end of the distal-end electrode can be brought into contact with the liquid stored in the storage space inside the first component, the proximal-end side of the distal-end electrode can be efficiently cooled.

(2) In the electrode catheter of the disclosure, preferably, the at least one lumen serving as the liquid flow path is eccentrically formed in the distal-end flexible portion, a plurality of the liquid injection ports is arranged at equiangular intervals along a circumferential direction of the insulating irrigation member, the flow path formed inside the proximal-end part of the second component is an eccentric flow path, and the storage space formed inside the first component includes no partition wall in the circumferential direction of the insulating irrigation member.

That is, preferably, the electrode catheter includes: a catheter shaft including a distal-end flexible portion, and having at least one lumen serving as a liquid flow path eccentrically formed in the distal-end flexible portion; an insulating irrigation member connected on a distal-end side of the catheter shaft; and a distal-end electrode having a hollow structure and connected on a distal-end side of the insulating irrigation member, a plurality of liquid injection ports for irrigating a surface of the distal-end electrode with a liquid supplied from the catheter shaft being arranged at a distal-end position (an apparent distal-end position) of the insulating irrigation member at equiangular intervals along a circumferential direction of the insulating irrigation member, in which a female thread is formed on an inner circumferential surface of the distal-end electrode, the insulating irrigation member includes: a first component having an annular shape and including an opening on a distal-end side and a proximal-end side, respectively; and a second component having an eccentric flow path formed inside a proximal-end part thereof and a male thread formed on a distal-end part thereof, the eccentric flow path communicating with the at least one lumen serving as the liquid flow path, the male thread being screwed to the female thread, and with the first component and the distal-end electrode fitted to each other, the first component and the second component fitted to each other, a distal-end portion of the second component inserted into the distal-end electrode, and the female thread and the male thread screwed to each other, the distal-end electrode and the insulating irrigation member are connected to each other while forming, inside the first component, a storage space for the liquid including no partition wall in the circumferential direction of the insulating irrigation member.

(3) In the electrode catheter according to (2) above, preferably, the distal-end electrode includes an electrode main body portion and a cylindrical portion smaller in outer diameter than the electrode main body portion, the first component of the insulating irrigation member includes a first component proximal-end part and a first component distal-end part smaller in inner diameter than the first component proximal-end part, the second component of the insulating irrigation member includes a second component proximal-end part with the eccentric flow path formed therein and a second component distal-end part with the male thread formed therein, the second component distal-end part being smaller in outer diameter than the second component proximal-end part, the cylindrical portion is inserted into the first component distal-end part and the first component and the distal-end electrode are fitted to each other, the distal-end portion of the second component proximal-end part is inserted into the first component proximal-end part and the first component and the second component are fitted to each other, and the distal-end portion of the second component distal-end part is inserted into the distal-end electrode and the female thread and the male thread are screwed to each other.

(4) In the electrode catheter according to (3) above, preferably, with a proximal-end surface of the electrode main body portion of the distal-end electrode being in contact with a distal-end surface of the first component, and a distal-end surface of the second component proximal-end part being in contact with a proximal-end surface of the first component distal-end part inside the first component, the storage space for the liquid is formed inside the first component distal-end part.

With the electrode catheter having such a configuration, it is possible to form a storage space for the liquid defined by the inner circumferential surface of the first component distal-end part, the outer circumferential surface of the second component distal-end part, the proximal-end surface of the cylindrical portion of the distal-end electrode, and the distal-end surface of the second component proximal-end part.

(5) In the electrode catheter according to (4) above, preferably, the following relationships (I) to (iv) are satisfied:

(i): $d_{211} < D_{222} \le d_{212}$
(ii): $D_{33} \le d_{211} < D_{32}$
(iii): $D_{221}/d_{211} < 0.8$
(iv): $L_{33}/L_{211} < 0.6$ where the inner diameter of the first component distal-end part is ($d_{211}$), the inner diameter of the first component proximal-end part is ($d_{212}$), the outer diameter of the second component distal-end part is ($D_{221}$), the outer diameter of the second component proximal-end part is ($D_{222}$), the outer diameter of the cylindrical portion of the distal-end electrode is ($D_{33}$), the outer diameter at the proximal end of the electrode main body portion of the distal-end electrode is ($D_{32}$), the length of the first component distal-end part is ($L_{211}$), and the length of the cylindrical portion of the distal-end electrode is ($L_{33}$).

With the electrode catheter having such a configuration, when (i) above is satisfied, the second component proximal-end part can be inserted into the first component proximal-end part but cannot be inserted into the first component distal-end part. Thus, inside the first component, the distal-end surface of the second component proximal-end part can be brought into contact with the proximal-end surface of the first component distal-end part.

When (ii) above is satisfied, the cylindrical portion of the distal-end electrode can be inserted into the first component distal-end part, but the electrode main body portion of the distal-end electrode cannot be inserted into the first component distal-end part. Accordingly, the proximal-end surface of the electrode main body portion of the distal-end electrode can be brought into contact with the distal-end surface of the first component (the first component distal-end part).

When (iii) and (iv) above are satisfied, the liquid from the eccentric flow path can be uniformly distributed in the circumferential direction of the insulating irrigation member, and a storage space having a sufficient capacity for efficiently cooling the proximal-end side of the distal-end electrode can be formed inside the first component distal-end part.

(6) In the electrode catheter of the disclosure, preferably, the first member proximal-end part has an annular shape, and the outer diameter of the first member distal-end part decreases along the distal-end direction.

With the electrode catheter having such a configuration, the liquid can be injected from the liquid injection port toward the outer side in the distal-end direction (the distal-end side in the axial direction of the insulating irrigation member and the outer side in the radial direction), and the surface of the distal-end electrode having a large size to a certain degree can be irrigated.

(7) In the electrode catheter according to any one of (3) to (6) above, preferably, guide grooves for the liquid are formed on an outer circumferential surface of the distal-end electrode, the guide grooves extending in the distal-end direction, while being inclined, from a proximal end of the cylindrical portion and reaching the electrode main body portion, a distal end-side opening edge of the first component of the insulating irrigation member is continuous on the same plane (the transverse cross section of the electrode catheter), and the liquid injection ports are defined and formed by respective formation parts of the guide grooves in the distal-end electrode, and the distal end-side opening edge of the first component of the insulating irrigation member.

(8) In the electrode catheter according to (7) above, preferably, a plurality of the guide grooves is formed on the outer circumferential surface of the distal-end electrode at equiangular intervals along the circumferential direction of the distal-end electrode.

That is, preferably, a plurality of the guide grooves for the liquid is formed on the outer circumferential surface of the distal-end electrode at equiangular intervals along the circumferential direction of the distal-end electrode, the plurality of guide grooves extending in the distal-end direction, while being inclined, from the proximal end of the cylindrical portion and reaching the electrode main body portion, the distal end-side opening edge of the first component of the insulating irrigation member is continuous on the same plane (the transverse cross section of the electrode catheter), and the liquid injection ports are defined and formed by the respective formation parts of the guide grooves in the distal-end electrode, and the distal end-side opening edge of the first component of the insulating irrigation member.

With the electrode catheter having such a configuration, the liquid injection ports are defined and formed by the respective formation parts of the guide grooves in the distal-end electrode and the distal end-side opening edge of the first component of the insulating irrigation member, the distal end-side opening edge of the first component defining and forming the liquid injection ports is continuous on the same plane, and no notch or the like capable of discharging the liquid is formed in the circumferential wall of the first component. As a result, the liquid can be injected only from the liquid injection ports located at the distal end of the insulating irrigation member and can flow in the distal-end direction along the guide grooves, so that the distal-end electrode can be efficiently irrigated.

(9) In the electrode catheter according to (8) above, preferably, the distal end-side opening edge of the first component is chamfered.

With the electrode catheter having such a configuration, since the gap between the respective formation parts of the guide grooves and the distal end-side opening edge of the first component (the area of each of the liquid injection ports) can be enlarged by chamfering, the injection amount of the liquid can be increased as compared with a case where chamfering is not performed.

(10) In the electrode catheter according to (9) above, preferably, an inclination angle ($\theta_1$) of the guide grooves formed on the outer circumferential surface of the distal-end electrode is from 10° to 20°, a chamfering angle ($\theta_2$) of the distal end-side opening edge of the first component is from 3° to 35°, and ($\theta_2-\theta_1$) is within ±15°.

(11) In the electrode catheter according to (8) above, guide grooves for the liquid may be formed, on an inner circumferential surface of the first component, each at a circumferential position corresponding to a respective one of the guide grooves formed in the outer circumferential surface of the distal-end electrode.

(12) In the electrode catheter according to any one of (2) to (11) above, preferably, the at least one lumen serving as the liquid flow path of the catheter shaft and the eccentric flow path of the insulating irrigation member communicate with each other via a joint tube.

With the electrode catheter having such a configuration, it is possible to reliably prevent leakage of the liquid (and resultant intrusion of the liquid into the shaft) at the contact portion between the distal-end surface of the catheter shaft (the distal-end surface at which the at least one lumen serving as the liquid flow path is open) and the proximal-end surface of the insulating irrigation member (the proximal-end surface of the second component at which the eccentric flow path is opened).

(13) In the electrode catheter according to any one of (2) to (12) above, preferably, the number of the eccentric flow paths formed inside the insulating irrigation member is one or two, and the number of the liquid injection ports is four or more.

When the number of the eccentric flow paths formed inside the insulating irrigation member is one or two (that is, when the number of the lumens serving as liquid flow path of the catheter shaft is one or two), it is particularly effective to attach the insulating irrigation member to the distal-end side of the catheter shaft (to cause the liquid supplied from the catheter shaft to flow through the inside (the eccentric flow path and the storage space) of the insulating irrigation member).

When the number of the liquid injection ports is four or more, irrigation can be sufficiently uniformly performed in the circumferential direction of the insulating irrigation member.

(14) The second component preferably includes a central through hole formed along a central axis thereof.

(15) In the electrode catheter according to (14) above, a lead wire of the distal-end electrode and/or a lead wire of a temperature sensor is preferably inserted into the central through hole.

The electrode catheter of the disclosure allows the distal-end electrode to be rigidly connected to the insulating irrigation member connected to the catheter shaft. This prevents the distal-end electrode from falling off the insulating irrigation member.

In addition, since the proximal end of the distal-end electrode can be brought into contact with the liquid stored in the storage space, the proximal-end side of the distal-end electrode where the edge is present can be efficiently cooled.

BRIEF DESCRIPTION OF DRAWINGS

FIG. 8A is a front view, FIG. 8B is a left-side view, and FIG. 8C is a right-side view.

FIG. 10A is a front view, FIG. 10B is a cross-sectional view taken along the Xb-Xb of FIG. 10A, and FIG. 10C is a right-side view.

FIG. 12A is a front view, FIG. 12B is a left-side view, FIG. 12C is a right-side view, FIG. 12D is a cross-sectional view taken along the XId-XId of FIG. 12B, and FIG. 12E is an enlarged view of a part E of FIG. 12D.

FIG. 13A is a front view, FIG. 13B is a left-side view, FIG. 13C is a right-side view, and FIG. 13D is a cross-sectional view taken along the XIId-XIId of FIG. 13C.

FIG. 14A is a perspective view and FIG. 14B is a cross-sectional view.

DESCRIPTION OF EMBODIMENTS

Figure 1:
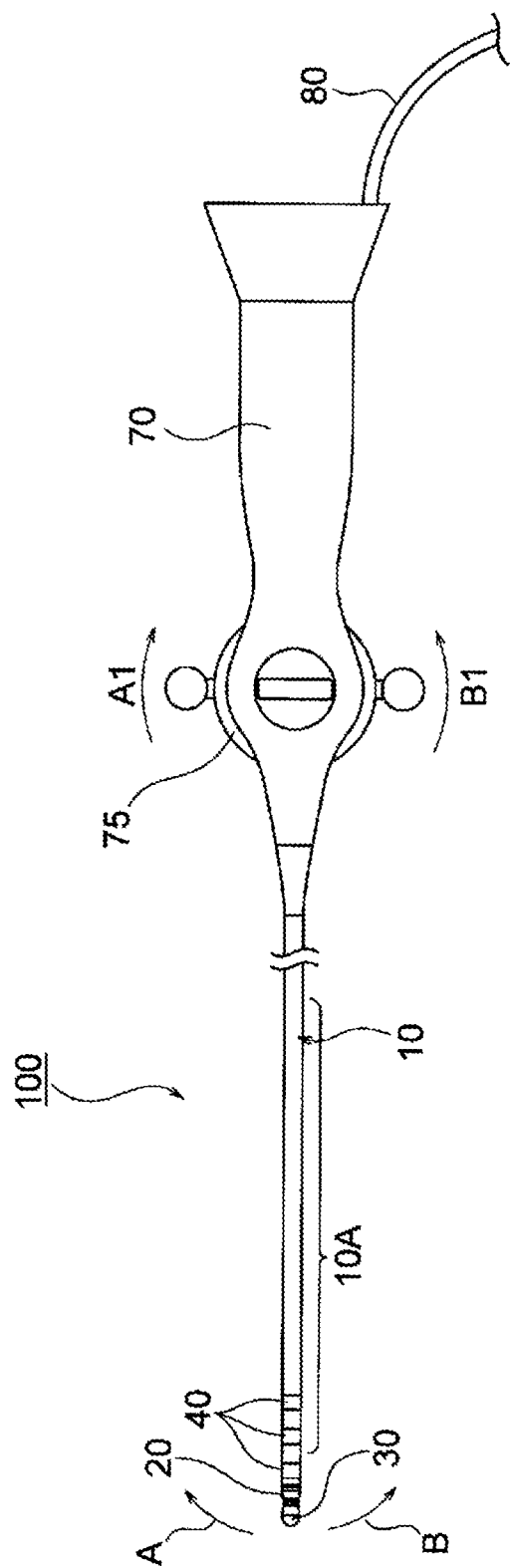
FIG. 1 is a front view of an ablation catheter in an embodiment of an electrode catheter according to the disclosure.

An embodiment of an electrode catheter of the disclosure will be described below with reference to the drawings.

An electrode catheter illustrated in FIGS. 1 to 7 is an ablation catheter used for treatment of arrhythmia in the heart according to the disclosure.

The ablation catheter 100 of the present embodiment includes: a catheter shaft 10 including a distal-end flexible portion 10A; an insulating irrigation member 20 connected on a distal-end side of the catheter shaft 10; a distal-end electrode 30 that has a hollow structure and connected on a distal-end side of the irrigation member 20; a ring-shaped electrode 40 attached to an outer circumferential surface of the distal-end flexible portion 10A of the catheter shaft 10; pulling wires 61, 62 constituting a deflection mechanism for flexing the distal-end flexible portion 10A of the catheter shaft 10; a leaf spring 65 arranged along a central axis of the catheter shaft 10 and constituting the deflection mechanism together with the pulling wires 61, 62; a control handle 70 connected on a proximal-end side of the catheter shaft 10; and a pouring tube 80 for a liquid. The distal-end flexible portion 10A of the catheter shaft 10 has formed therein two lumens 11, 11 serving as liquid flow paths and formed facing each other with the central axis interposed therebetween (that is, the two lumens 11, 11 are eccentric from the central axis), lumens 121, 123 serving as insertion paths for the pulling wire 61, lumens 122, 124 serving as insertion paths for the pulling wire 62, a lumen 131 serving as an insertion path for a lead wire 30L of the distal-end electrode 30, and a lumen 132 serving as an insertion path for a lead wire 40L of the ring-shaped electrode 40. Eight liquid injection ports 25 for injecting the liquid supplied from the catheter shaft 10 onto a surface of the distal-end electrode 30 (irrigating the surface of the distal-end electrode 30 with the liquid supplied from the catheter shaft 10) are arranged at equiangular intervals (45° intervals) along a circumferential direction of the irrigation member 20 at a distal-end position (apparent distal-end position) of the irrigation member 20. The distal-end electrode 30 includes a distal-end swelling part 31 that is an electrode main body portion, a neck part 32 that is an electrode main body portion continuing to a proximal-end side of the distal-end swelling part 31, and a cylindrical portion 33 smaller in outer diameter than the neck part 32, and a female thread 329 is formed on an inner circumferential surface of the distal-end electrode 30. The irrigation member 20 includes a first component 21 having an annular shape and including an opening on a distal-end side and a proximal-end side, respectively, and a second component 22 in which two eccentric flow paths 23, 23 each communicating with a respective one of the lumens 11, 11 of the catheter shaft 10 are formed. The first component 21 includes a first component proximal-end part 212 and a first component distal-end part 211 smaller in inner diameter than the first component proximal-end part 212. The second component 22 includes a second component proximal-end part 222 in which the eccentric flow paths 23, 23 are formed and a second component distal-end part 221 that is smaller in outer diameter than the second component proximal-end part 222 and in which a male thread 229 screwed to the female thread 329 is formed. The distal-end electrode 30 and the irrigation member 20 are connected to each other with the cylindrical portion 33 inserted into the first component distal-end part 211 and the first component 21 and the distal-end electrode 30 fitted to each other, the distal-end portion of the second component proximal-end part 222 inserted into the first component proximal-end part 212 and the first component 21 and the second component 22 fitted to each other, and the distal-end portion of the second component distal-end part 221 inserted into the distal-end electrode 30 and the female thread 329 and the male thread 229 screwed to each other. A proximal-end surface of the neck part 32 of the distal-end electrode 30 is in contact with a distal-end surface of the first component 21, and a distal-end surface of the second component proximal-end part 222 is in contact with a proximal-end surface of the first component distal-end part 211 inside the first component 21, whereby a storage space 24 for the liquid including no partition wall in a circumferential direction of the irrigation member 20 is formed inside the first component distal-end part 211. Eight guide grooves 36 are formed on the outer circumferential surface of the distal-end electrode 30 at equiangular intervals (45° intervals) along the circumferential direction of the distal-end electrode 30, the eight guide grooves 36 extending in the distal-end direction, while being inclined, from the proximal end of the cylindrical portion 33 and reaching the neck part 32. A distal end-side opening edge of the first component 21 (the first component distal-end part 211) is continuous on the same plane (the transverse cross section of the ablation catheter 100). The liquid injection ports 25 are defined and formed by the respective formation parts of the guide grooves 36 in the distal-end electrode 30 and the distal end-side opening edge of the first component 21 of the irrigation member 20.

The ablation catheter 100 of the present embodiment includes the catheter shaft 10, the irrigation member 20, the distal-end electrode 30, the ring-shaped electrode 40, the pulling wires 61, 62, the leaf spring 65, the control handle 70, and the pouring tube 80 for the liquid.

The pouring tube 80 illustrated in FIG. 1 is connected to the catheter shaft 10 through the inside of the control handle 70. The liquid is supplied to the lumens 11, 11 of the catheter shaft 10 through the pouring tube 80. The "liquid" herein can be physiological saline as an example.

The control handle 70 illustrated in FIG. 1 is connected on the proximal-end side of the catheter shaft 10 and includes a rotary plate 75 for deflecting the distal-end of the catheter.

The catheter shaft 10 constituting the ablation catheter 100 includes the distal-end flexible portion 10A.

The "distal-end flexible portion" herein refers to a distal-end portion of the catheter shaft that can be flexed (bent) by pulling the wire for deflecting the distal-end.

Figure 2:
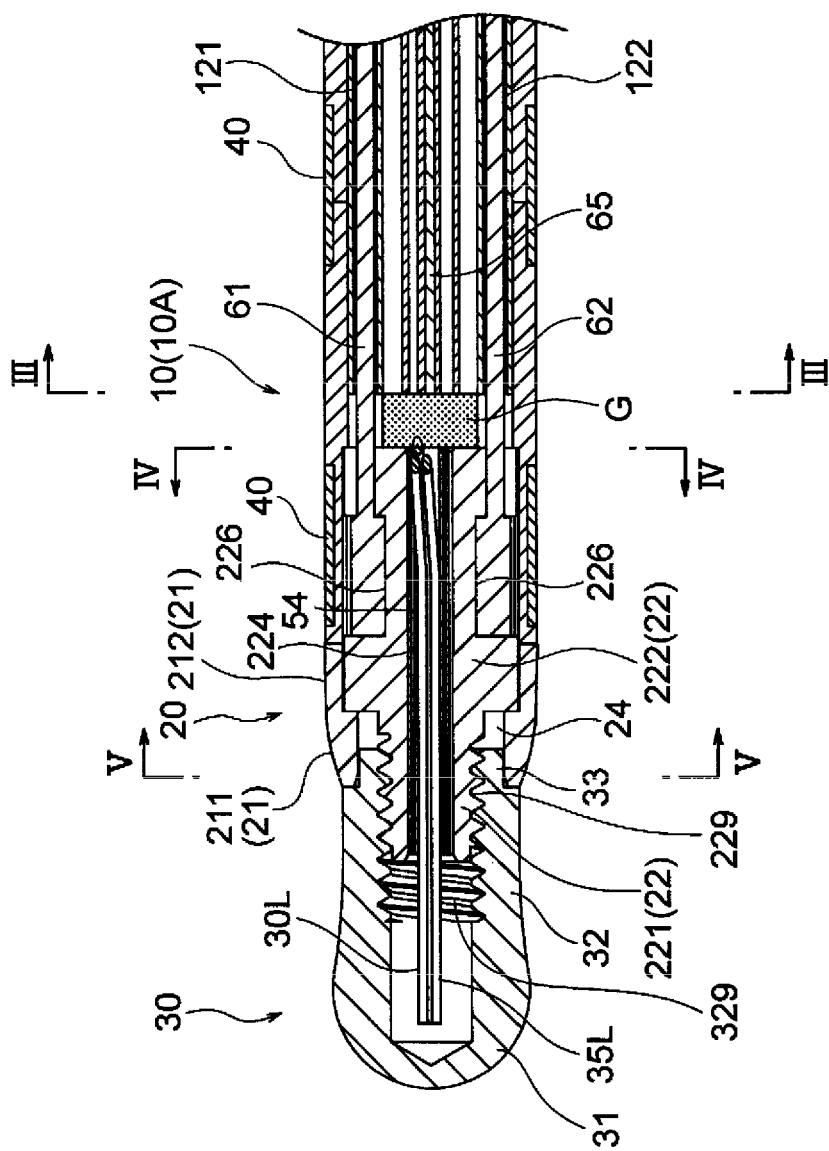
FIG. 2 is a longitudinal cross-sectional view at a distal-end portion of the ablation catheter illustrated in FIG. 1.
Figure 3:
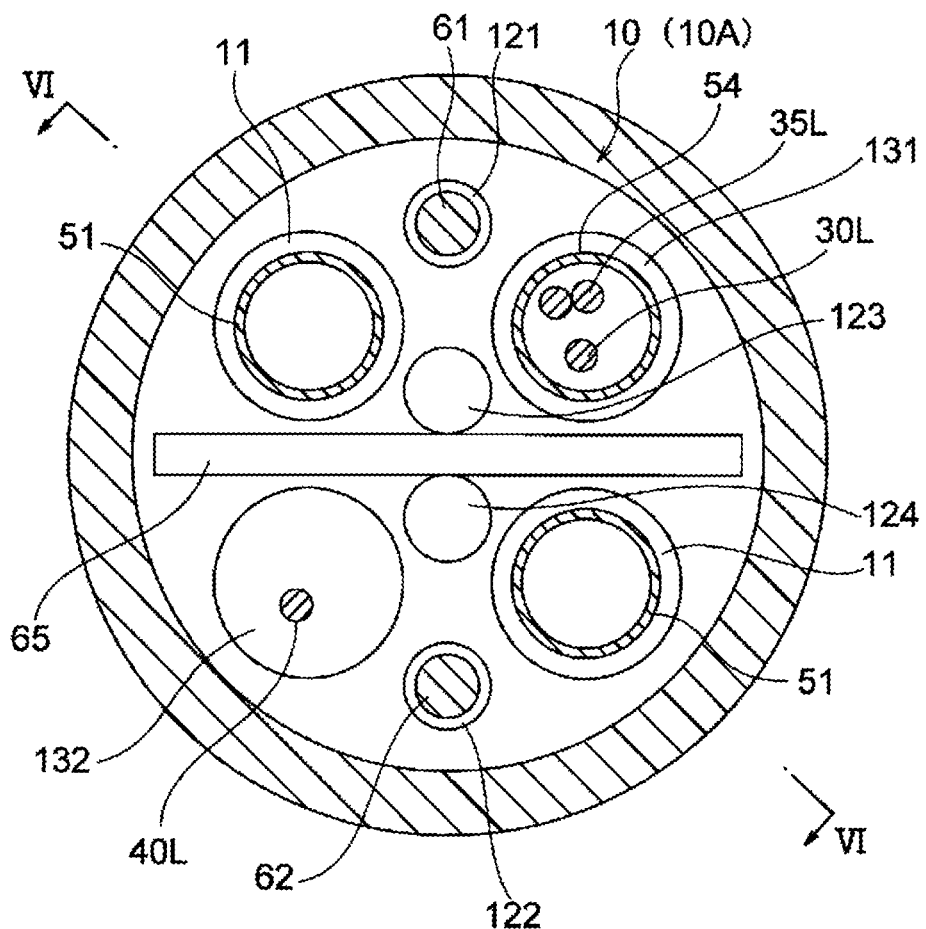
FIG. 3 is a transverse cross-sectional view at the distal-end portion of the ablation catheter illustrated in FIG. 1 (cross-sectional view taken along the III-III in FIG. 2).
Figure 4:
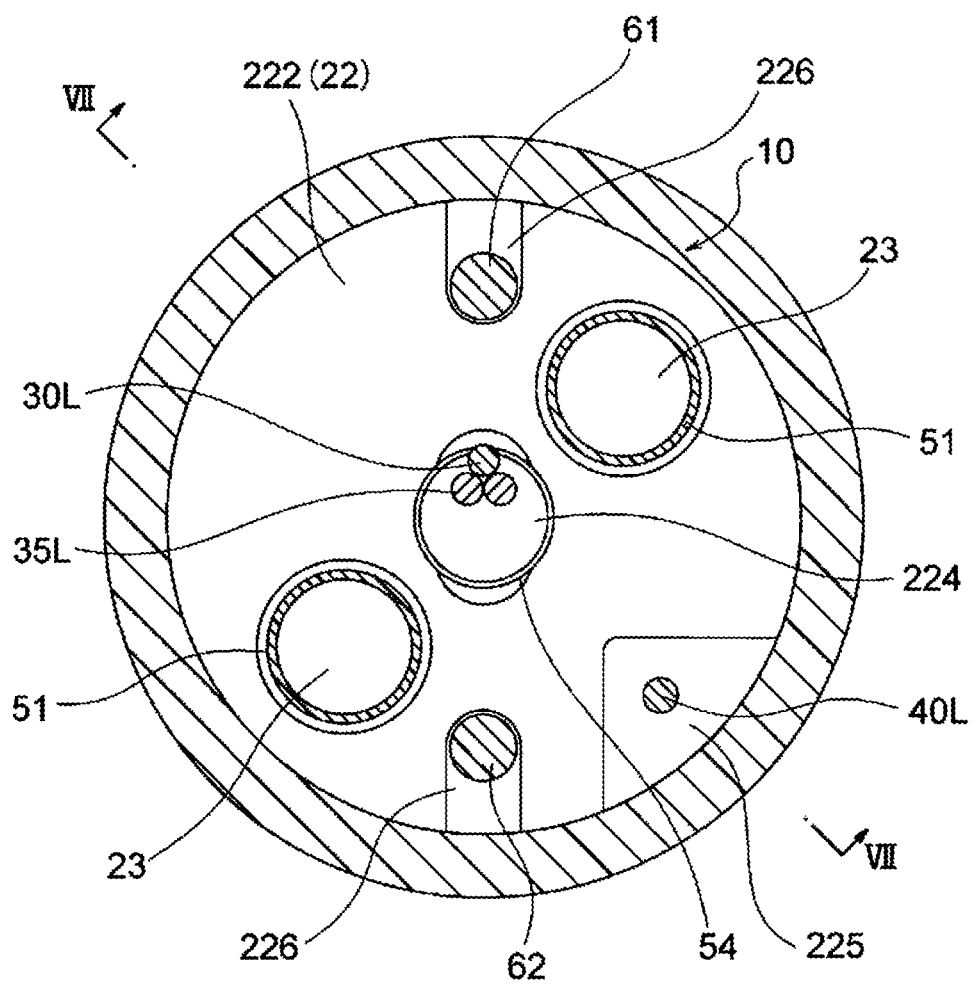
FIG. 4 is a transverse cross-sectional view at the distal-end portion of the ablation catheter illustrated in FIG. 1 (cross-sectional view taken along the IV-IV in FIG. 2).
Figure 5:
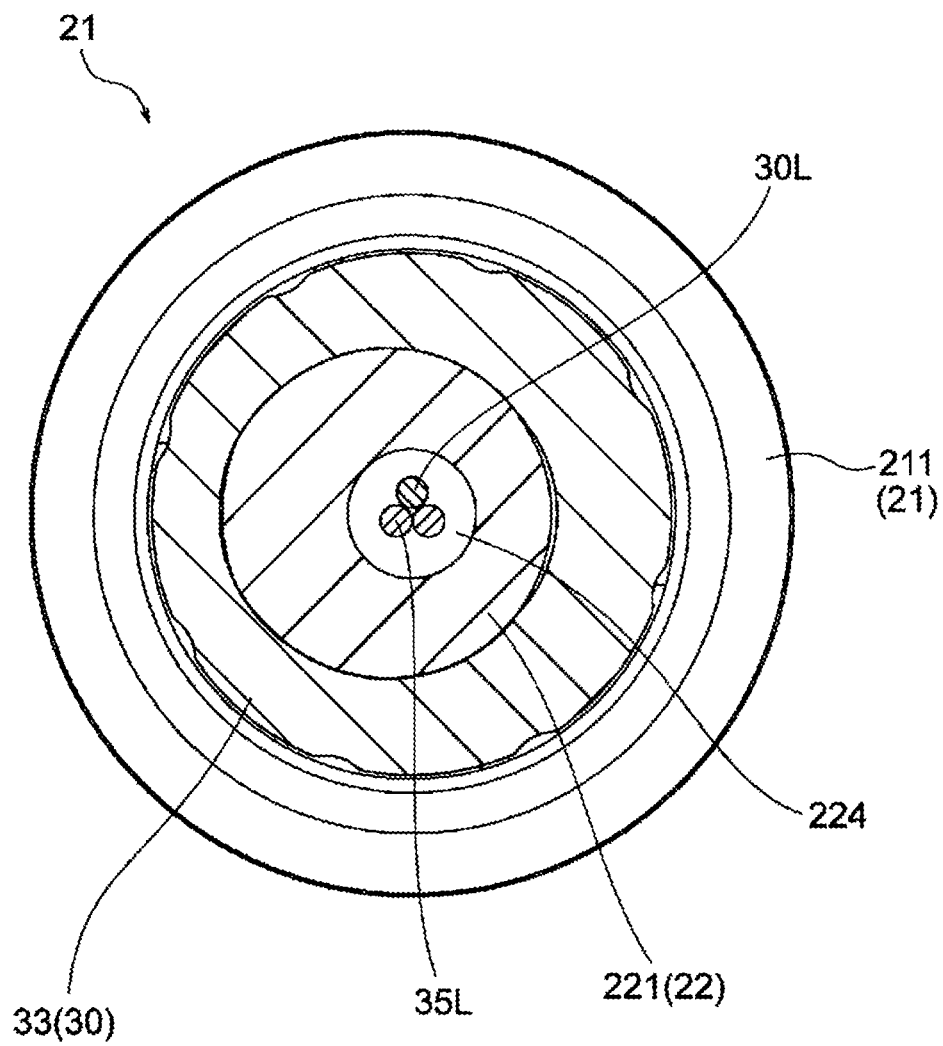
FIG. 5 is a transverse cross-sectional view at the distal-end portion of the ablation catheter illustrated in FIG. 1 (cross-sectional view taken along the V-V in FIG. 2).

As illustrated in FIGS. 2 and 3, the pulling wires 61, 62 for flexing the distal-end flexible portion 10A (deflecting the distal-end) are arranged in the catheter shaft 10 (lumens 121, 122). The proximal-end parts of the pulling wires 61, 62 are each connected to the rotary plate 75 (see FIG. 1) of the control handle 70. On the other hand, the distal-end parts of the pulling wire 61, 62 are fixed in storage grooves 226 formed in the outer circumferential surface of the irrigation member 20 (second component 22).

For example, rotating the rotary plate 75 in the direction A1 illustrated in FIG. 1 pulls the pulling wire 61 to deflect the distal-end flexible portion 10A of the catheter shaft 10 in the arrow A direction, and rotating the rotary plate 75 in the direction B1 illustrated in FIG. 1 pulls the pulling wire 62 to deflect the distal-end flexible portion 10A of the catheter shaft 10 in the arrow B direction.

As illustrated in FIG. 3, the leaf spring 65 is arranged in the distal-end flexible portion 10A of the catheter shaft 10 along the central axis of the catheter shaft 10 on a plane perpendicular to the arrangement direction of the pulling wires 61, 62 (flexing direction of the distal-end flexible portion 10A).

Arranging the leaf spring 65 in the distal-end flexible portion 10A secures the anisotropic property in the flexing direction and imparts sufficient torsional rigidity to the distal-end flexible portion 10A, so that the operability in distal-end deflection can be improved.

Figure 6:
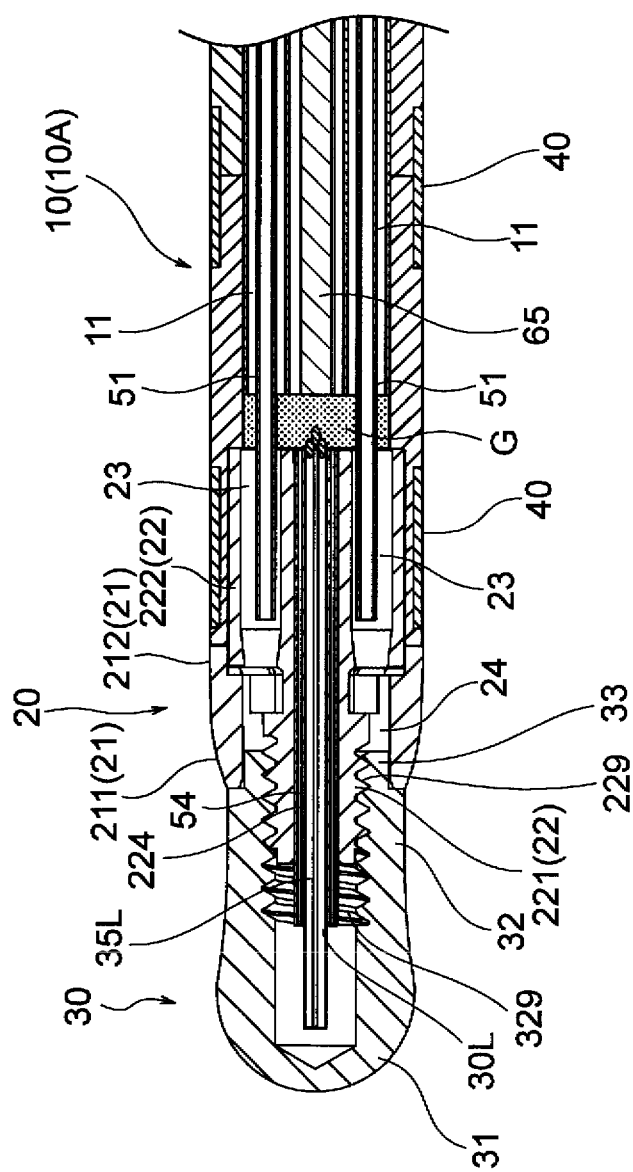
FIG. 6 is a longitudinal cross-sectional view at the distal-end portion of the ablation catheter illustrated in FIG. 1 (cross-sectional view taken along the VI-VI in FIG. 3).

As illustrated in FIGS. 3 and 6, two lumens 11, 11 serving as liquid flow paths are formed, in the distal-end flexible portion 10A of the catheter shaft 10, facing each other with the central axis of the catheter shaft 10 interposed therebetween.

Note that the two lumens 11, 11 in the distal-end flexible portion 10A may join together in the shaft portion on the proximal-end side of the distal-end flexible portion 10A.

As illustrated in FIG. 3, the distal-end flexible portion 10A has formed therein the two lumens 121, 123 serving as insertion paths for the pulling wire 61, the two lumens 122, 124 serving as insertion paths for the pulling wire 62, the lumen 131 serving as an insertion path for the lead wire 30L of the distal-end electrode 30 and the lead wire 35L of the temperature sensor (thermocouple), and the lumen 132 serving as an insertion path for the lead wire of the ring-shaped electrode 40.

Note that although the pulling wire 61 is inserted through the lumen 121 and the pulling wire 62 is inserted through the lumen 122 in FIG. 3, the lumens through which the pulling wires 61, 62 are inserted are exchanged at the proximal-end part of the distal-end flexible portion 10A, so that the pulling wire 61 is inserted through the lumen 123 and the pulling wire 62 is inserted through the lumen 124 in the catheter shaft 10 on the proximal-end side of the proximal-end part of the distal-end flexible portion 10A.

Thus, the distal-end flexible portion 10A of the catheter shaft 10 has a so-called multi-lumen structure. However, a distal end-side recess having a single-lumen structure is formed at the distal end of the distal-end flexible portion 10A for joining with the irrigation member 20 to be described later.

The catheter shaft 10 is made of a synthetic resin such as polyolefin, polyamide, polyether polyamide, polyurethane, nylon, and polyether block amide (PEBAX), for example. The proximal-end side of the catheter shaft 10 may be a braided tube obtained by braiding a tube made of such a synthetic resin with a stainless wire.

The outer diameter of the catheter shaft 10 is preferably from 2.3 mm to 2.9 mm, and is 2.65 mm in a preferred example.

The length (effective length) of the catheter shaft 10 is preferably from 600 mm to 1500 mm, and is 1100 mm in a preferred example.

Figure 10A:
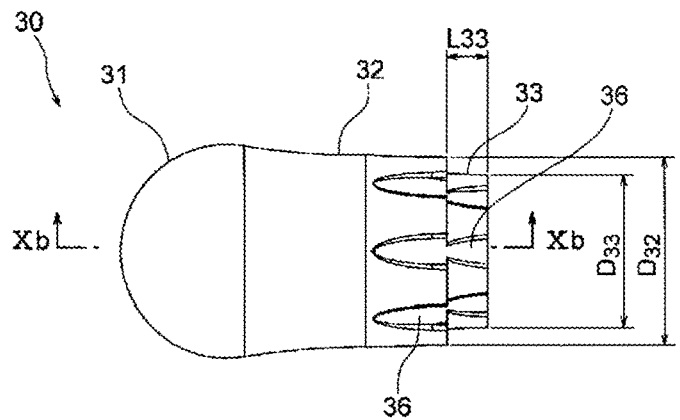
FIGS. 10A, 10B, and 10C are explanatory diagrams illustrating the distal-end electrode constituting the ablation catheter illustrated in FIG. 1, where
Figure 10B:
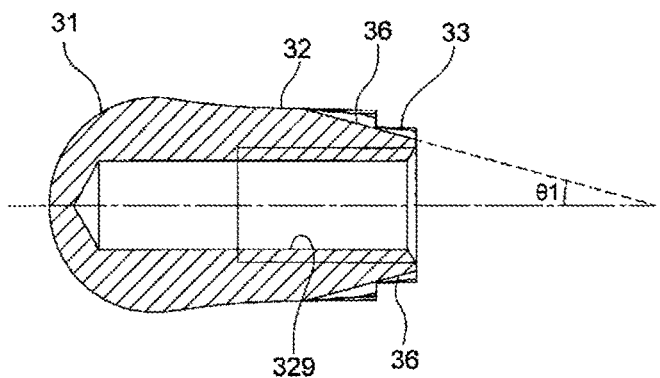
Figure 10C:
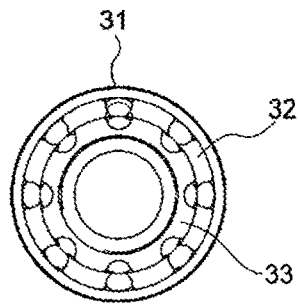
Figure 11:
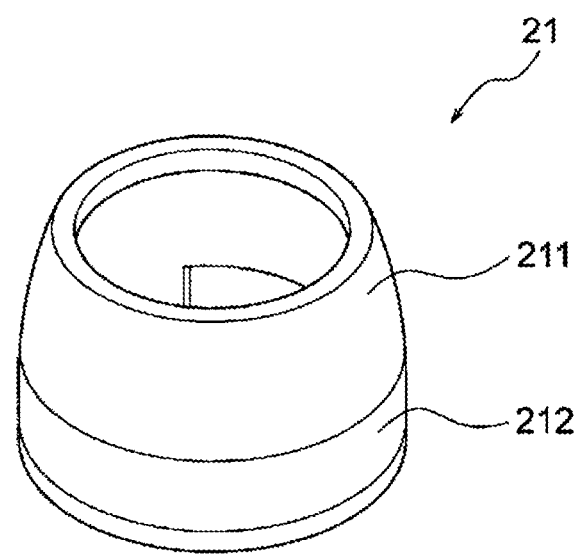
FIG. 11 is a perspective view of a first component of the irrigation member illustrated in FIGS. 8A, 8B, and 8C.

As illustrated in FIGS. 10A, 10B, and 10C, the distal-end electrode 30 constituting the ablation catheter 100 includes the hemispherical distal-end swelling part 31, the neck part 32, and the cylindrical portion 33.

The cylindrical portion 33 is inserted into the first component 21 (first component distal-end part 211) to fit the distal-end electrode 30 and the irrigation member 20 (first component 21) to each other, and is not visible on the exterior of the ablation catheter 100.

The distal-end electrode 30 has a hollow structure, and the distal-end parts of the lead wire 30L and the lead wire 35L are arranged inside the distal-end electrode 30.

The female thread 329 is formed on the inner circumferential surface of the distal-end electrode 30.

As illustrated in FIGS. 10A, 10B, and 10C, the eight guide grooves 36 are formed on the outer circumferential surface of the distal-end electrode 30 at equiangular intervals (45° intervals) along the circumferential direction of the distal-end electrode 30, the eight guide grooves 36 extending in the distal-end direction, while being inclined with respect to the central axis, from the proximal end of the cylindrical portion 33 and reaching the neck part 32.

The guide grooves 36 extend in the distal-end direction while being inclined with respect to the central axis of the distal-end electrode 30.

Since the guide grooves 36 are formed, the liquid can be guided (led) to the distal-end part of the distal-end electrode 30, whereby the liquid can be supplied to the entire surface of the distal-end electrode 30 including the distal-end swelling part 31.

Note that since the guide grooves 36 formed in the distal-end electrode 30 have a gentle R shape, no abnormal rise in temperature occurs in these portions even during cauterization.

The outer diameter of the distal-end swelling part 31 of the distal-end electrode 30 is preferably from 2.2 mm to 2.9 mm, and is 2.62 mm in a preferred example.

The outer diameter ($D_{32}$) of the distal-end electrode 30 at the proximal end of the neck part 32 is preferably from 1.9 mm to 2.5 mm, and is 2.35 mm in a preferred example.

The outer diameter ($D_{33}$) of the cylindrical portion 33 of the distal-end electrode 30 is preferably from 1.5 mm to 2.0 mm, and is 1.92 mm in a preferred example.

The length of the distal-end electrode 30 (including the cylindrical portion 33) is preferably from 1.5 mm to 10.5 mm, and is 4.5 mm in a preferred example.

The length ($L_{33}$) of the cylindrical portion 33 is preferably from 0.2 mm to 1.0 mm, and is 0.5 mm in a preferred example.

The inclination angle ($\theta_1$) of the guide grooves 36 is preferably from 10° to 20°, and is 15° in a preferred example.

In the ablation catheter 100, the injection of the liquid onto the surface of the distal-end electrode 30 (the irrigation of the surface of the distal-end electrode 30 with the liquid) is performed by the irrigation member 20 located on the distal-end side of the catheter shaft 10 (the proximal-end side of the distal-end electrode 30).

Figure 7:
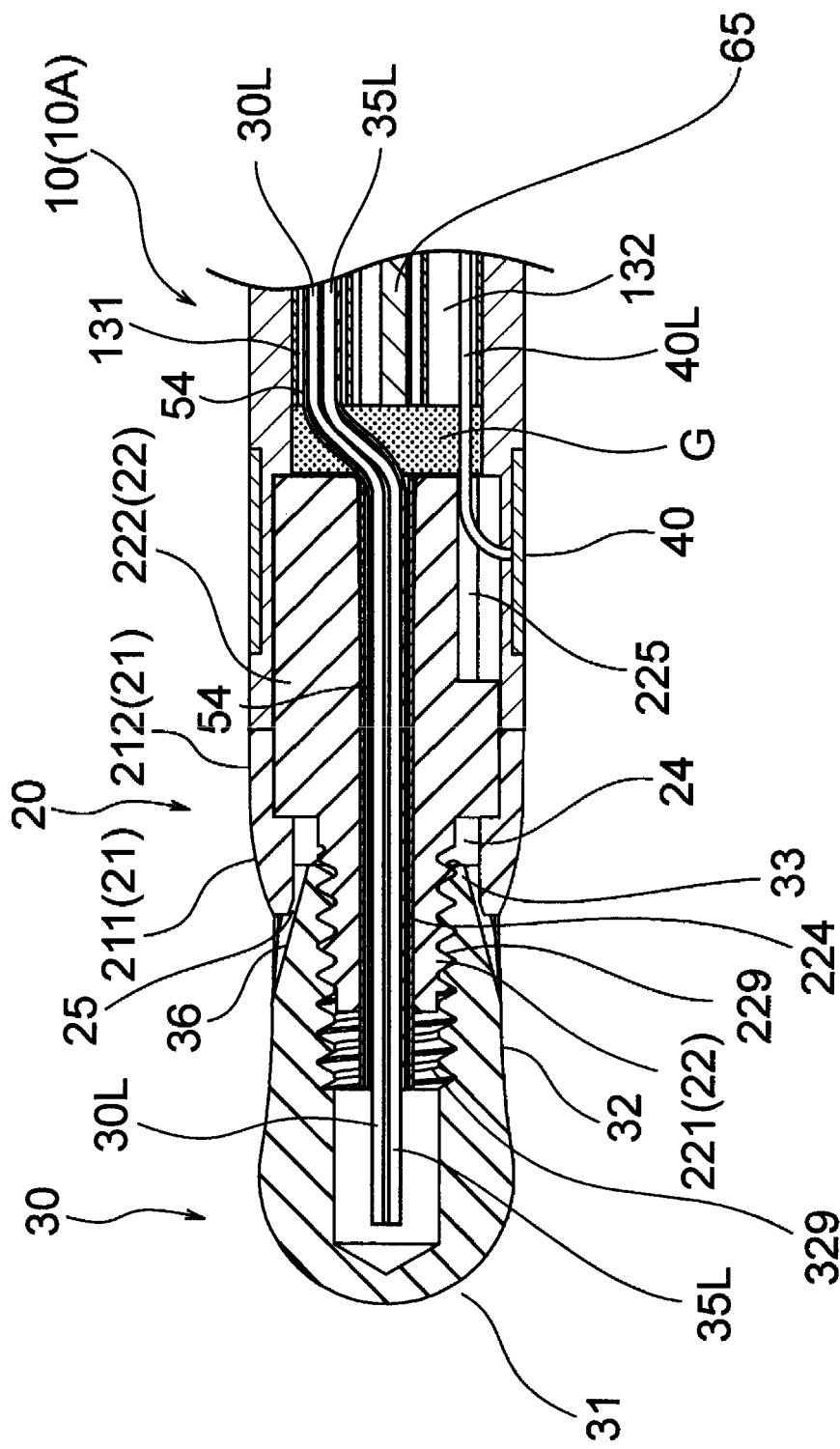
FIG. 7 is a longitudinal cross-sectional view at the distal-end portion of the ablation catheter illustrated in FIG. 1 (cross-sectional view taken along the VII-VII in FIG. 4).
Figure 8A:
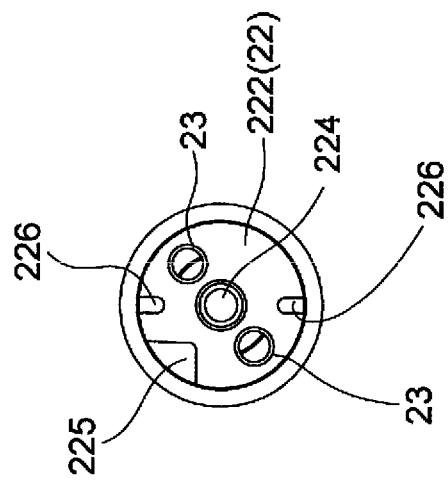
FIGS. 8A, 8B, and 8C are explanatory diagrams illustrating a distal-end electrode and an irrigation member constituting the ablation catheter illustrated in FIG. 1, where
Figure 8B:
Figure 8C:
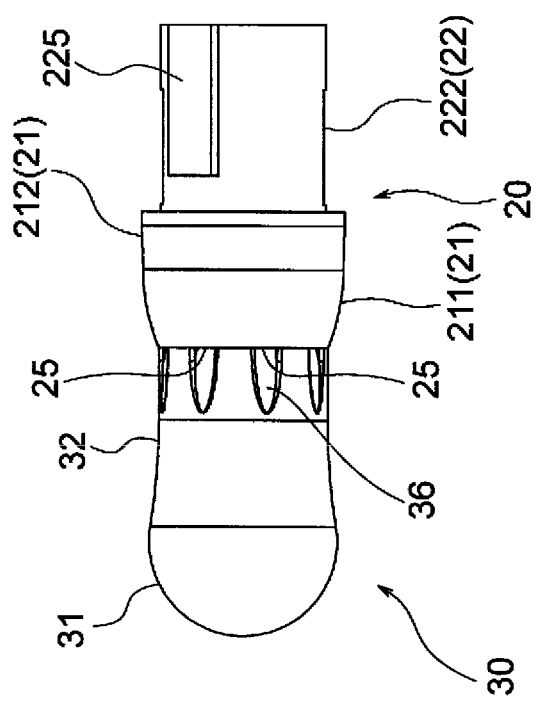
Figure 9:
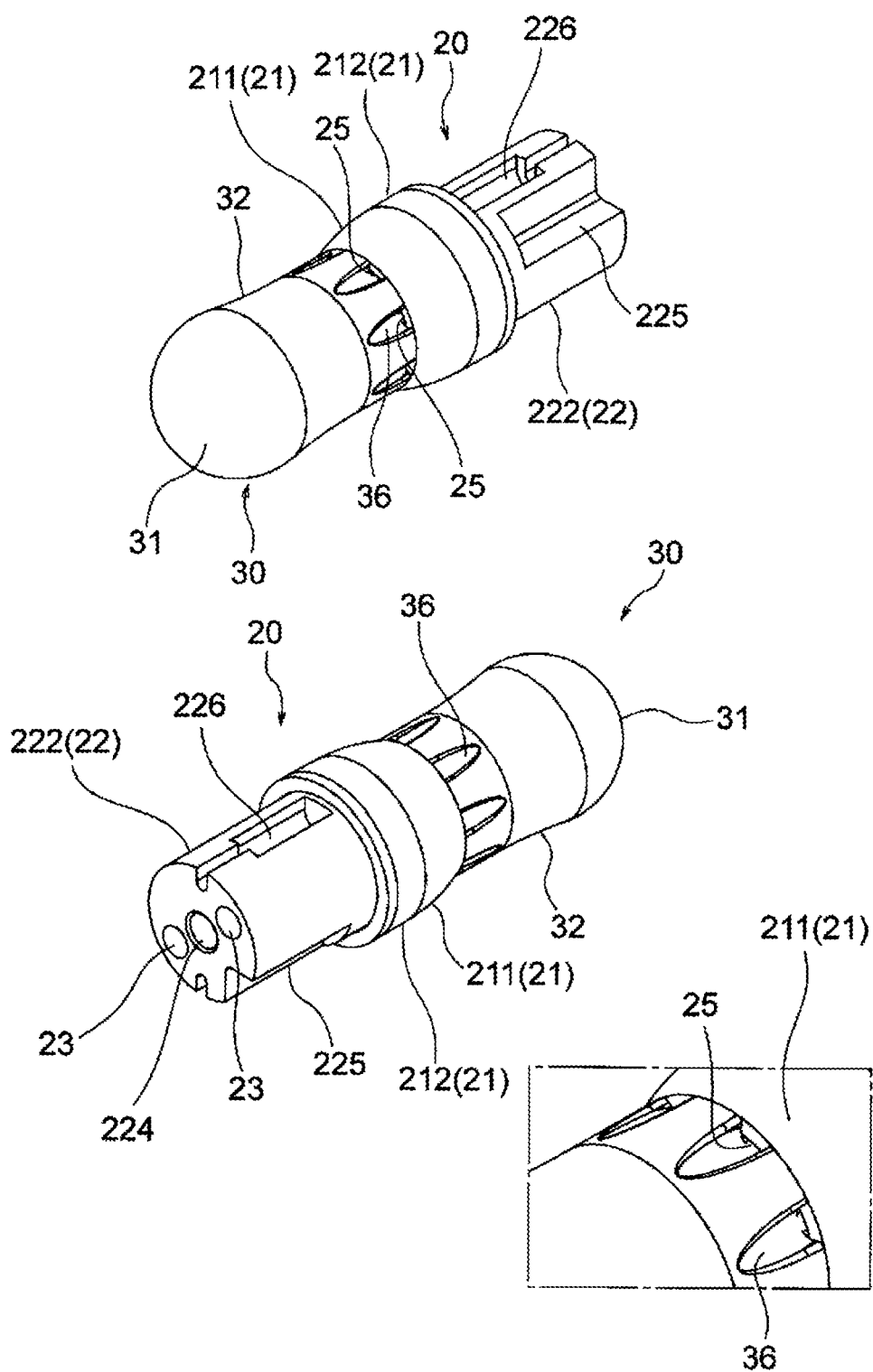
FIG. 9 is a perspective view of the distal-end electrode and the irrigation member constituting the ablation catheter illustrated in FIG. 1.

As illustrated in FIGS. 7 and 9, at the distal-end position of the irrigation member 20, the eight liquid injection ports 25 for injecting the liquid supplied from the catheter shaft 10 onto the surface of the distal-end electrode 30 (irrigating the surface of the distal-end electrode 30 with the liquid supplied from the catheter shaft 10) are arranged at equiangular intervals (45° intervals) along the circumferential direction of the irrigation member 20.

The "distal-end position of the irrigation member 20" herein refers to a distal-end position (position of connection with the distal-end electrode 30) that is visible on the exterior of the ablation catheter 100.

As illustrated in FIGS. 2 and 6 to 9, the irrigation member 20 is constituted by the first component 21 and the second component 22 fitted to each other.

As illustrated in FIGS. 11 and 12A, 12B, 12C, 12D, and 12E, the first component 21 of the irrigation member 20 is an annular component including an opening on the distal-end side and the proximal-end side, respectively.

The first component 21 is formed of a molded body in which the first component proximal-end part 212 and the first component distal-end part 211 smaller in inner diameter than the first component proximal-end part 212 are integrally formed.

The inner diameter ($d_{212}$) of the first component proximal-end part 212 is preferably from 2.1 mm to 2.6 mm, and is 2.35 mm in a preferred example.

The inner diameter ($d_{211}$) of the first component distal-end part 211 is preferably from 1.51 mm to 2.01 mm, and is 1.95 mm in a preferred example.

The outer diameter of the first component proximal-end part 212 is substantially the same as the outer diameter of the catheter shaft 10. The outer diameter of the first component distal-end part 211 decreases in the distal-end direction, and the minimum outer diameter of the first component distal-end part 211 is substantially the same as the outer diameter of the neck part 32 of the distal-end electrode 30.

The length of the first component 21 is preferably from 1 mm to 3 mm, and is 1.9 mm in a preferred example.

The length of the inner diameter ($L_{211}$) of the first component distal-end part 211 is preferably from 0.35 mm to 1.7 mm, and is 1.0 mm in a preferred example.

No notch or the like is formed in the circumferential wall of the first component 21, and the distal-end surface including the distal end-side opening edge and the proximal-end surface including the proximal-end side opening edge of the first component 21 are each continuous on the same plane.

Figures 12A, 12B:
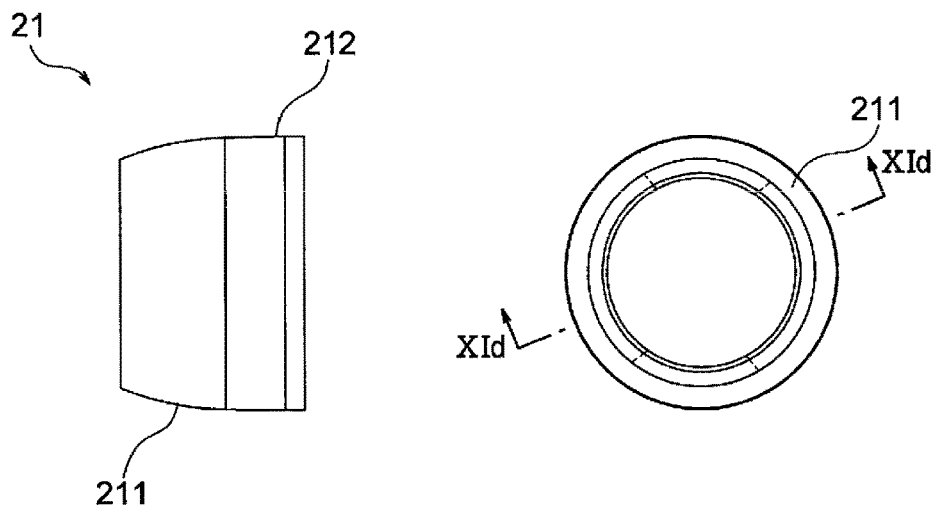
FIGS. 12A, 12B, 12C, 12D, and 12E are explanatory diagrams illustrating the first component of the irrigation member illustrated in FIGS. 8A, 8B, and 8C, where
Figures 12C, 12D:
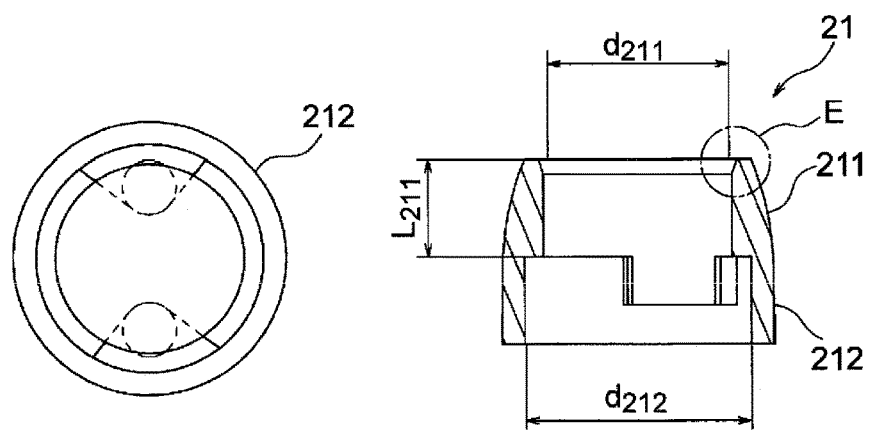
Figure 12E:
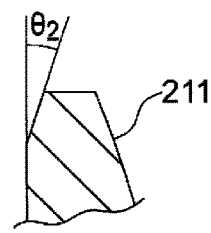

As illustrated in FIGS. 12D and 12E, the opening edge of the first component 21 (first component distal-end part 211) is chamfered.

Here, the chamfering angle ($\theta_2$) is preferably from 3° to 35°, and is 18° in a preferred example.

As illustrated in FIGS. 7 and 9, the liquid injection ports 25 are defined and formed by the respective formation parts (formation edges) of the guide grooves 36 in the distal-end electrode 30 and the distal end-side opening edge of the first component 21 (first component distal-end part 211).

As described above, since the distal end-side opening edge of the first component 21 is continuous on the same plane and no notch or the like is formed in the circumferential wall of the first component 21, the liquid supplied from the catheter shaft 10 can be injected in a manner concentrated in the distal-end direction from the liquid injection ports 25, and the injected liquid can efficiently reach the entire surface of the distal-end electrode 30 including the distal-end swelling part 31.

Figure 15A:
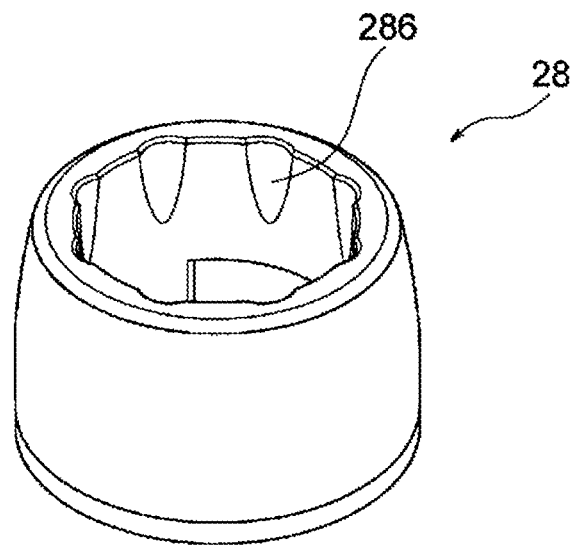
FIGS. 15A and 15B are perspective view illustrating a modification of the first component of the irrigation member.
Figure 15B:
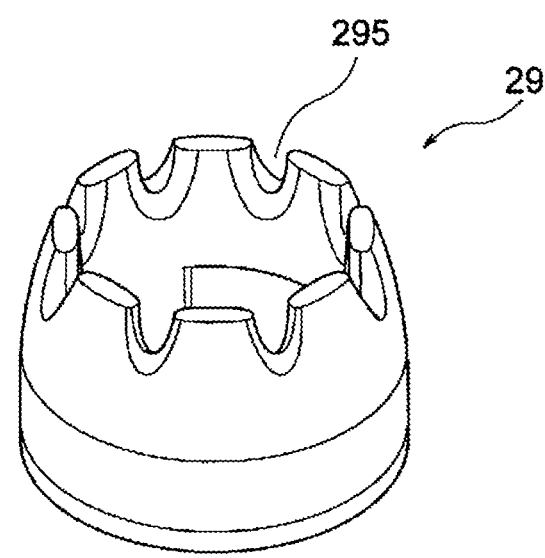

If a notch or the like is formed in the circumferential wall of the first component and the distal end-side opening edge is not continuous on the same plane (has a crown shape as illustrated in FIG. 15B), part of the liquid is injected from the injection port including the notch or the like in the radial direction of the irrigation member, so that the liquid cannot efficiently reach the entire surface of the distal-end electrode.

As described above, since the opening edge of the first component 21 (first component distal-end part 211) is chamfered, the area of the liquid injection ports 25 defined and formed by the respective formation parts (formation edges) of the guide grooves 36 and the distal end-side opening edge of the first component 21 can be sufficiently enlarged as compared to a case where no chamfering is performed, so that it is possible to secure a sufficient injection amount of the liquid from the liquid injection ports 25.

From the viewpoint of securing a sufficient area of the liquid injection ports 25, the difference ($\theta_2$-$\theta_1$) between the above-described chamfering angle ($\theta_2$) and the inclination angle ($\theta_1$) of the guide grooves 36 is preferably within ±15°, and is 3° (18°-15°) in a preferred example.

Figures 13A, 13B:
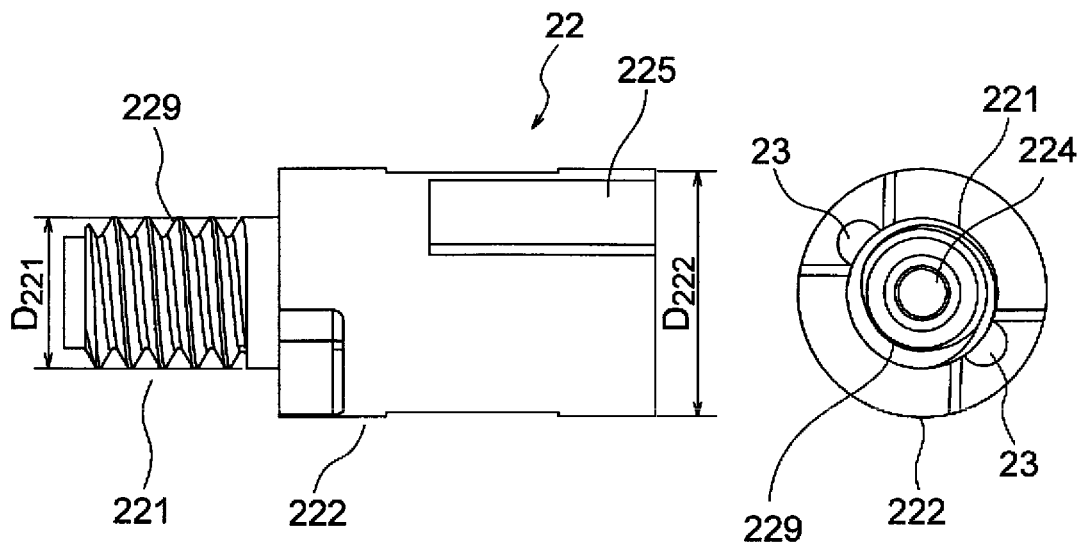
FIGS. 13A, 13B, 13C, and 13D are explanatory diagrams illustrating a second component of the irrigation member illustrated in FIGS. 8A, 8B, and 8C, where
Figures 13C, 13D:
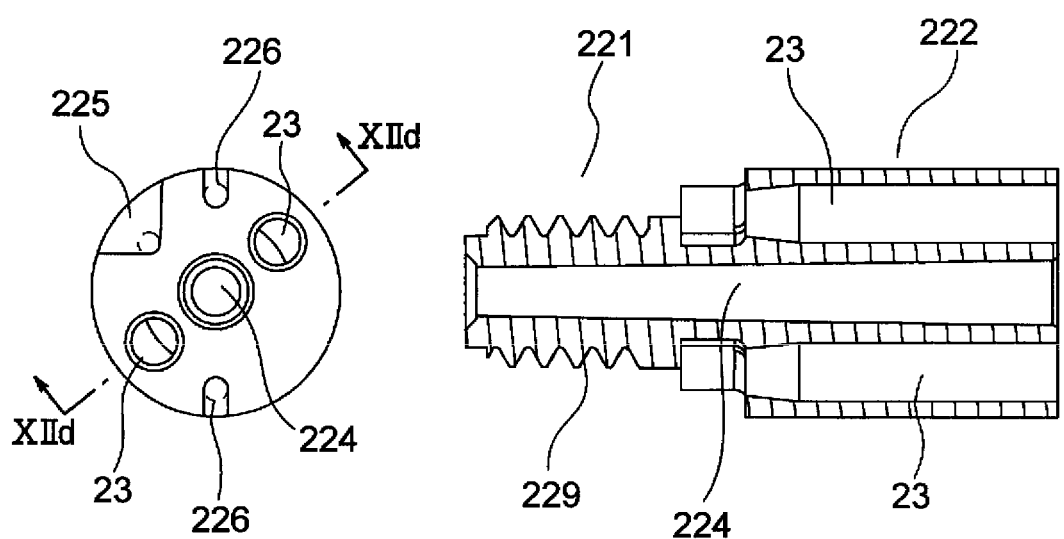

As illustrated in FIG. 13D, a central through hole 224 is formed along the central axis inside the second component 22 of the irrigation member 20, and the two eccentric flow paths 23, 23 extending in parallel across the central through hole 224 are formed inside the second component proximal-end part 222.

Here, the eccentric flow paths 23, 23 each communicate with a respective one of the lumens 11, 11 of the catheter shaft 10.

The lead wire 30L of the distal-end electrode 30 and the lead wire 35L of the temperature sensor extend through the central through hole 224.

As illustrated in FIG. 7, the lead wire 30L and the lead wire 35L extending in the lumen 131 of the catheter shaft 10 can be guided by a tube 54 and displaced in a gap G formed between the catheter shaft 10 and the irrigation member 20 (second component proximal-end part 222) to extend into the central through hole 224 of the second component proximal-end part 222.

Note that the gap G is filled with an adhesive except for the insertion paths for the pulling wires 61, 62.

The second component 22 is formed of a molded body in which the second component proximal-end part 222 and the second component distal-end part 221 smaller in outer diameter than the second component proximal-end part 222 are integrally formed.

The outer diameter ($D_{222}$) of the second component proximal-end part 222 is preferably from 2.09 mm to 2.59 mm, and is 2.31 mm in a preferred example.

The outer diameter ($d_{221}$) of the second component distal-end part 221 is preferably from 1.0 mm to 1.5 mm, and is 1.4 mm in a preferred example.

The length of the second component 22 is preferably from 4 mm to 7 mm, and is 5.5 mm in a preferred example.

The length of the second component distal-end part 221 is preferably from 1.5 mm to 2.5 mm, and is 2.0 mm in a preferred example.

A storage groove 225 for the lead wire is formed on the outer circumferential surface of the second component proximal-end part 222.

Storage grooves 226, 226 for storing and fixing the distal-end parts of the pulling wires 61, 62 are formed on the outer circumferential surface of the second component proximal-end part 222.

A storage groove 225 for storing the lead wire 40L of the ring-shaped electrode 40 (the first second pole from the distal end) is formed on the outer circumferential surface of the second component proximal-end part 222.

It is only by the storage groove 225 of the lead wire 40L being formed on the outer circumferential surface of the second component proximal-end part 222 that the ring-shaped electrodes 40 can be attached to the outer circumferential surface (region) of the catheter shaft 10 in which the irrigation member is located.

As a result, the separation distance between the distal-end electrode 30 and the first ring-shaped electrode 40 from the distal end can be reduced (for example, to about 2 mm), and desirable potential measurement can be made between these electrodes.

The male thread 229 is formed on the outer circumferential surface of the second component distal-end part 221. After the second component distal-end part 221 is inserted into the distal-end electrode 30, the male thread 229 is screwed to the female thread 329 formed on the inner circumferential surface of the distal-end electrode 30.

As illustrated in FIG. 6, the openings of the eccentric flow paths 23, 23 in the proximal-end surface (FIG. 4) of the second component 22 each face a respective one of the openings of the lumens 11, 11 in the distal-end surface (FIG. 3) of the catheter shaft 10.

The lumens 11, 11 of the catheter shaft 10 and the eccentric flow paths 23, 23 of the irrigation member 20 (second component 22) communicate with each other via the joint tubes 51, 51, respectively.

As a result, the connection between the catheter shaft 10 and the irrigation member 20 can be made reliable, and the leakage of the liquid at the contact portion between the distal-end surface of the catheter shaft 10 (the opening surfaces of the lumens 11, 11) and the proximal-end surface 22b of the irrigation member 20 (the opening surfaces of the eccentric flow paths 23, 23), and by extension intrusion of the liquid into the shaft can be prevented.

The first component 21 and the second component 22 constituting the irrigation member 20 are made of molded bodies of an insulating resin.

As a result, even in a case where an edge is formed in the irrigation member 20, electric current does not concentrate at the edge portion and the temperature does not become high when the ablation catheter 100 is used (cauterization).

Since a molded body of an insulating resin has higher X-ray permeability than a molded body of a ceramic material, the ring-shaped electrodes 40 attached to the outer circumferential surface (region) of the catheter shaft 10 including the irrigation member 20 can be easily distinguished under X-ray fluoroscopy.

Preferred examples of the insulating resin constituting the irrigation member 20 include hard resins such as polycarbonate, polystyrene, polypropylene, high-density polyethylene, polyacetal, polymethyl methacrylate, and polyetheretherketone.

As illustrated in FIGS. 2, 6, and 7, the cylindrical portion 33 is inserted into the first component distal-end part 211 and the first component 21 and the distal-end electrode 30 are fitted to each other, the distal-end portion of the second component proximal-end part 222 is inserted into the first component proximal-end part 212 and the first component 21 and the second component 22 are fitted to each other, the distal-end portion of the second component distal-end part 221 is inserted into the distal-end electrode 30 and the female thread 329 and the male thread 229 are screwed to each other, so that the distal-end electrode 30 and the irrigation member 20 are connected to each other. The proximal-end surface of the neck part 32 of the distal-end electrode 30 is in contact with the distal-end surface of the first component 21, and the distal-end surface of the second component proximal-end part 222 is in contact with the proximal-end surface of the first component distal-end part 211 inside the first component 21, so that the storage space 24 for the liquid including no partition wall in the circumferential direction of the irrigation member 20 is formed inside the first component distal-end part 211.

In the ablation catheter 100 of the present embodiment, the outer diameter ($D_{222}$) of the second component proximal-end part 222 is larger than the inner diameter ($d_{211}$) of the first component distal-end part 211 and is equal to or smaller than the inner diameter of the first component proximal-end part 212 ($d_{212}$).

In the preferred example described above, the outer diameter ($D_{222}$) of the second component proximal-end part 222 is 2.31 mm, the inner diameter ($d_{211}$) of the first component distal-end part 211 is 1.95 mm, and the inner diameter ($d_{212}$) of the first component proximal-end part 212 is 2.35 mm.

Thus, the second component proximal-end part 222 can be inserted into the first component proximal-end part 212 but cannot be inserted into the first component distal-end part 211. Thus, inside the first component 21, the distal-end surface of the second component proximal-end part 222 can be brought into contact with the proximal-end surface of the first component distal-end part 211.

In the ablation catheter 100, the inner diameter ($d_{211}$) of the first component distal-end part 211 is equal to or larger than the outer diameter ($D_{33}$) of the cylindrical portion 33 of the distal-end electrode 30 and is smaller than the outer diameter ($D_{32}$) at the proximal end of the neck part 32.

In the preferred example described above, the inner diameter ($d_{211}$) of the first component distal-end part 211 is 1.95 mm, the outer diameter ($D_{33}$) of the cylindrical portion 33 is 1.92 mm, and the outer diameter ($D_{32}$) at the proximal end of the neck part 32 is 2.35 mm.

Accordingly, the cylindrical portion 33 of the distal-end electrode 30 can be inserted into the first component distal-end part 211, but the neck part 32 of the distal-end electrode cannot be inserted into the first component distal-end part 211. Thus, the proximal-end surface of the neck part 32 of the distal-end electrode 30 can be brought into contact with the distal-end surface of the first component 21 (the first component distal-end part 211).

In the ablation catheter 100, the value of the ratio ($D_{221}/d_{211}$) of the outer diameter ($D_{221}$) of the second component distal-end part 221 to the inner diameter ($d_{211}$) of the first component distal-end part 211 is less than 1.0, preferably less than 0.8.

If the value of the ratio ($D_{221}/d_{211}$) exceeds 1.0, the second component distal-end part 221 cannot be inserted into the first component distal-end part 211. If the ratio is 1.0, the storage space 24 for the liquid cannot be formed inside the first component distal-end part 211.

In the preferred example described above, the inner diameter ($d_{211}$) of the first component distal-end part 211 is 1.95 mm, the outer diameter ($D_{221}$) of the second component distal-end part 221 is 1.4 mm, and the value of the ratio ($D_{221}/d_{211}$) is 0.72.

The value of the ratio ($L_{33}/L_{211}$) of the length ($L_{33}$) of the cylindrical portion 33 of the distal-end electrode 30 to the length ($L_{211}$) of the first component distal-end part 211 is less than 1.0, preferably less than 0.6.

If the value of the ratio ($L_{33}/L_{211}$) exceeds 1.0, the storage space 24 for the liquid cannot be formed inside the first component distal-end part 211.

In the preferred example described above, the length ($L_{211}$) of the first component distal-end part 211 is 1.0 mm, the length ($L_{33}$) of the cylindrical portion 33 is 0.5 mm, and the value of the ratio ($L_{33}/L_{211}$) is 0.5.

Since the value of the ratio ($D_{221}/d_{211}$) is less than 0.8 and the value of the ratio ($L_{33}/L_{211}$) is less than 0.6, the liquid from the eccentric flow paths 23, 23 can be uniformly distributed in the circumferential direction of the irrigation member 20, and the storage space 24 having a sufficient capacity for efficiently cooling the proximal-end side of the distal-end electrode 30 can be formed inside the first component distal-end part.

The irrigation member 20 configured as described above includes: the two eccentric flow paths 23, 23 formed, inside the second component 22 (second component proximal-end part 222), communicating with the lumens 11, 11 of the catheter shaft 10 serving as liquid flow paths; the storage space 24 for the liquid that is a space communicating with the eccentric flow paths 23, 23, that is formed inside the first component 21 (first component distal-end part 211) such that the liquid from the eccentric flow paths 23, 23 is uniformly distributed in the circumferential direction of the irrigation member 20, and that includes no partition wall in the circumferential direction; and the liquid injection ports 25 arranged at the distal end of the first component 21 (first component distal-end part 211).

With the ablation catheter 100 of the present embodiment, the first component 21 and the distal-end electrode 30 are fitted to each other, the first component 21 and the second component 22 are fitted to each other, and the female thread 329 formed on the inner circumferential surface of the distal-end electrode 30 fitted to the first component 21 and the male thread 229 formed on the second component 22 fitted to the first component 21 are screwed to each other, so that the distal-end electrode 30 and the second component 22 are connected to each other with the first component 21 sandwiched therebetween. Accordingly, the distal-end electrode 30 can be rigidly connected to the irrigation member 20. This reliably prevents the distal-end electrode 30 from falling off the irrigation member 20 connected to the catheter shaft 10.

Since the proximal end of the distal-end electrode 30 can be brought into contact with the liquid stored in the storage space 24 inside the first component 21, it is possible to efficiently cool the proximal-end side of the distal-end electrode 30 including the edge that is likely to reach high temperatures when a high-frequency current is applied.

Since the liquid injection ports 25 are defined and formed by the respective formation parts of the guide grooves 36 in the distal-end electrode 30 and the distal end-side opening edge of the first component 21 of the irrigation member 20, and the distal end-side opening edge of the first component 21 defining and forming the liquid injection ports 25 is continuous on the same plane, the liquid supplied from the catheter shaft 10 can be injected in a manner concentrated in the distal-end direction from the liquid injection ports 25, and the injected liquid can efficiently reach the entire surface of the distal-end electrode 30 including the distal-end swelling part 31.

Although one embodiment of the disclosure has been described above, the disclosure is not limited thereto, and various modifications can be made.

For example, the number of branch flow paths (liquid injection ports) in the irrigation member need not be eight, and can be selected as appropriate in a range of four to twelve, for example.

The number of lumens serving as the liquid flow paths of the catheter shaft (the number of eccentric flow paths in the irrigation member) need not be two, and may be one or three or more. However, the disclosure is effective when a catheter shaft including a small number of lumens serving as liquid flow paths is used.

In addition, the internal structure of the catheter shaft is not particularly limited as long as the lumens serving as the liquid flow paths are eccentrically formed in the distal-end flexible portion.

The shape of the distal-end electrode is not particularly limited, and may have a bullet-like shape or the like.

Figure 14A:
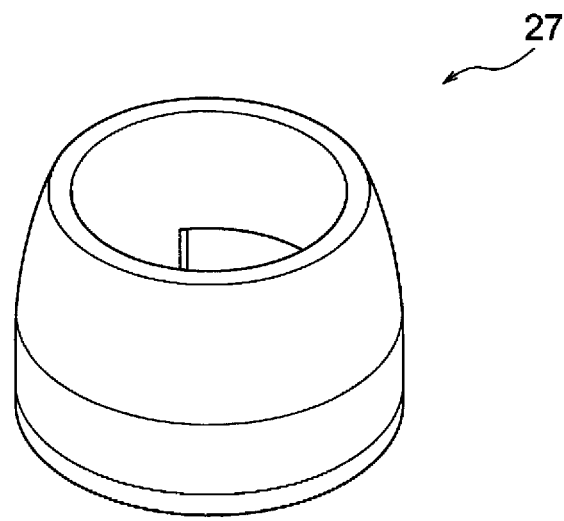
FIGS. 14A and 14B are explanatory diagrams illustrating a modification of the first component of the irrigation member, where
Figure 14B:
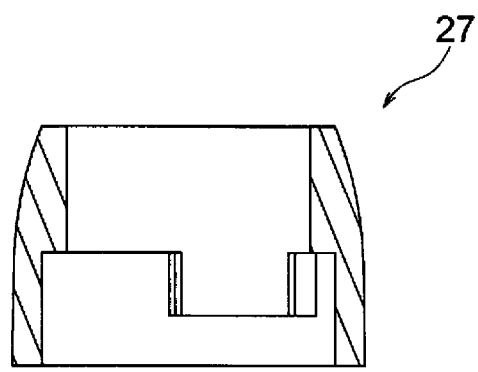

As in a first component 27 illustrated in FIGS. 14A and 14B, the distal end-side opening edge need not be chamfered.

As in a first component 28 illustrated in FIG. 15A, guide grooves 286 for the liquid may be formed in the inner circumferential surface of the first component distal-end part at a circumferential position corresponding to the guide grooves formed in the outer circumferential surface of the distal-end electrode.

As in a first component 29 illustrated in FIG. 15B, notches 295 may be formed in the circumferential wall thereof, and the distal end-side opening edge need not be continuous on the same plane.

The electrode catheter of the disclosure can be applied not only to known ablation using a high-frequency current but also to ablation using irreversible electroporation (IRE).

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. An electrode catheter comprising:
   a catheter shaft including a distal-end flexible portion and having at least one lumen serving as a liquid flow path formed therein;
   an insulating irrigation member connected on a distal-end side of the catheter shaft;
   a distal-end electrode having a hollow structure and connected on a distal-end side of the insulating irrigation member; and
   at least one liquid injection port for irrigating a surface of the distal-end electrode with a liquid supplied from the catheter shaft being arranged at a distal-end position of the insulating irrigation member,
   wherein a female thread is formed on an inner circumferential surface of the distal-end electrode,
   wherein the insulating irrigation member includes:
      a first component having an annular shape and including an opening on a distal-end side and a proximal-end side, respectively; and
      a second component having a flow path formed inside a proximal-end part thereof and a male thread formed on a distal-end part thereof, the flow path communicating with the at least one lumen serving as the liquid flow path, the male thread being screwed to the female thread, and with the first component and the distal-end electrode fitted to each other, the first component and the second component fitted to each other, a distal-end portion of the second component inserted into the distal-end electrode, and the female thread and the male thread screwed to each other, the distal-end electrode and the insulating irrigation member are connected to each other while forming a storage space for the liquid inside the first component, and
   wherein the flow path formed inside the proximal-end part of the second component is an eccentric flow path, and
   wherein the storage space stores the liquid supplied from the eccentric flow path and the liquid stored in the storage space is supplied to the liquid injection port.

2. The electrode catheter according to claim 1, wherein the second component includes a central through hole formed along a central axis thereof.

3. The electrode catheter according to claim 2, wherein a lead wire of the distal-end electrode and/or a lead wire of a temperature sensor is inserted into the central through hole.

4. An electrode catheter, comprising:
   a catheter shaft including a distal-end flexible portion and having at least one lumen serving as a liquid flow path formed therein;
   an insulating irrigation member connected on a distal-end side of the catheter shaft;
   a distal-end electrode having a hollow structure and connected on a distal-end side of the insulating irrigation member; and
   at least one liquid injection port for irrigating a surface of the distal-end electrode with a liquid supplied from the catheter shaft being arranged at a distal-end position of the insulating irrigation member,
   wherein a female thread is formed on an inner circumferential surface of the distal-end electrode,
   wherein the insulating irrigation member includes:
      a first component having an annular shape and including an opening on a distal-end side and a proximal-end side, respectively, and
      a second component having a flow path formed inside a proximal-end part thereof and a male thread formed on a distal-end part thereof, the flow path communicating with the at least one lumen serving as the liquid flow path, the male thread being screwed to the female thread, and with the first component and the distal-end electrode fitted to each other, the first component and the second component fitted to each other, a distal-end portion of the second component inserted into the distal-end electrode, and the female thread and the male thread screwed to each other, the distal-end electrode and the insulating irrigation member are connected to each other while forming a storage space for the liquid inside the first component,
   wherein the at least one lumen serving as the liquid flow path is eccentrically formed in the distal-end flexible portion,
   wherein a plurality of the liquid injection ports is arranged at equiangular intervals along a circumferential direction of the insulating irrigation member, wherein the flow path formed inside the proximal-end part of the second component is an eccentric flow path, and wherein the storage space formed inside the first component includes no partition wall in the circumferential direction of the insulating irrigation member.

5. The electrode catheter according to claim 4, wherein the distal-end electrode includes an electrode main body portion, and a cylindrical portion smaller in outer diameter than the electrode main body portion, the first component of the insulating irrigation member includes a first component proximal-end part, and a first component distal-end part smaller in inner diameter than the first component proximal-end part, the second component of the insulating irrigation member includes a second component proximal-end part with the eccentric flow path formed therein, and a second component distal-end part with the male thread formed therein, the second component distal-end part being smaller in outer diameter than the second component proximal-end part, the cylindrical portion is inserted into the first component distal-end part and the first component and the distal-end electrode are fitted to each other, the distal-end portion of the second component proximal-end part is inserted into the first component proximal-end part and the first component and the second component are fitted to each other, and the distal-end portion of the second component distal-end part is inserted into the distal-end electrode and the female thread and the male thread are screwed to each other.

6. The electrode catheter according to claim 5, wherein with a proximal-end surface of the electrode main body portion of the distal-end electrode being in contact with a distal-end surface of the first component, and a distal-end surface of the second component proximal-end part being in contact with a proximal-end surface of the first component distal-end part inside the first component, the storage space for the liquid is formed inside the first component distal-end part.

7. The electrode catheter according to claim 6, wherein the following relationships (i) to (iv) are satisfied:

(i): $d_{211} < D_{222} \leq d_{212}$
(ii): $D_{33} \leq d_{211} < D_{32}$
(iii): $D_{221}/d_{211} < 0.8$
(iv): $L_{33}/L_{211} < 0.6$ where the inner diameter of the first component distal-end part is ($d_{211}$), the inner diameter of the first component proximal-end part is ($d_{212}$), the outer diameter of the second component distal-end part is ($D_{221}$), the outer diameter of the second component proximal-end part is ($D_{222}$), the outer diameter of the cylindrical portion of the distal-end electrode is ($D_{33}$), the outer diameter at a proximal end of the electrode main body portion of the distal-end electrode is ($D_{32}$), a length of the first component distal-end part is ($L_{211}$), and a length of the cylindrical portion of the distal-end electrode is ($L_{33}$).

8. The electrode catheter according to claim 5, wherein guide grooves for the liquid are formed on an outer circumferential surface of the distal-end electrode, the guide grooves extending in a distal-end direction, while being inclined, from a proximal end of the cylindrical portion and reaching the electrode main body portion, a distal end-side opening edge of the first component of the insulating irrigation member is continuous on the same plane, and the liquid injection ports are defined and formed by respective formation parts of the guide grooves in the distal-end electrode, and the distal end-side opening edge of the first component of the insulating irrigation member.

9. The electrode catheter according to claim 8, wherein a plurality of the guide grooves is formed on the outer circumferential surface of the distal-end electrode at equiangular intervals along the circumferential direction of the distal-end electrode.

10. The electrode catheter according to claim 9, wherein the distal end-side opening edge of the first component is chamfered.

11. The electrode catheter according to claim 10, wherein an inclination angle ($\theta_1$) of the guide grooves formed on the outer circumferential surface of the distal-end electrode is from 10° to 20°, a chamfering angle ($\theta_2$) of the distal end-side opening edge of the first component is from 3° to 35°, and ($\theta_2 - \theta_1$) is within ±15°.

12. The electrode catheter according to claim 9, wherein guide grooves for the liquid are formed, on an inner circumferential surface of the first component, each at a circumferential position corresponding to a respective one of the guide grooves formed in the outer circumferential surface of the distal-end electrode.

13. The electrode catheter according to claim 4, wherein the at least one lumen serving as the liquid flow path of the catheter shaft and the eccentric flow path of the insulating irrigation member communicate with each other via a joint tube.

14. The electrode catheter according to claim 4, wherein the number of the eccentric flow paths formed inside the insulating irrigation member is one or two, and the number of the liquid injection ports is four or more.

15. An electrode catheter, comprising:

a catheter shaft including a distal-end flexible portion and having at least one lumen serving as a liquid flow path formed therein;

an insulating irrigation member connected on a distal-end side of the catheter shaft;

a distal-end electrode having a hollow structure and connected on a distal-end side of the insulating irrigation member; and at least one liquid injection port for irrigating a surface of the distal-end electrode with a liquid supplied from the catheter shaft being arranged at a distal-end position of the insulating irrigation member, wherein a female thread is formed on an inner circumferential surface of the distal-end electrode, wherein the insulating irrigation member includes a first component having an annular shape and including an opening on a distal-end side and a proximal-end side, respectively, wherein a second component having a flow path formed inside a proximal-end part thereof and a male thread formed on a distal-end part thereof, the flow path communicating with the at least one lumen serving as the liquid flow path, the male thread being screwed to the female thread, and with the first component and the distal-end electrode fitted to each other, the first component and the second component fitted to each other, a distal-end portion of the second component inserted into the distal-end electrode, and the female thread and the male thread screwed to each other, the distal-end electrode and the insulating irrigation member are connected to each other while forming a storage space for the liquid inside the first component, wherein the first member proximal-end part has an annular shape, and wherein the outer diameter of the first member distal-end part decreases along a distal-end direction.

* * * * *